(12) United States Patent
Margatan

(10) Patent No.: US 10,372,785 B2
(45) Date of Patent: Aug. 6, 2019

(54) CLIENT-SIDE MODULARIZATION OF A REQUESTED WEBPAGE

(71) Applicant: Microsoft Technology Licensing, LLC, Redmond, WA (US)

(72) Inventor: James Margatan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 15/248,385

(22) Filed: Aug. 26, 2016

(65) Prior Publication Data

US 2018/0032627 A1 Feb. 1, 2018

Related U.S. Application Data

(60) Provisional application No. 62/368,662, filed on Jul. 29, 2016.

(51) Int. Cl.
| | |
|---|---|
| *G06F 15/16* | (2006.01) |
| *G06F 16/958* | (2019.01) |
| *H04L 29/08* | (2006.01) |
| *H04L 29/06* | (2006.01) |
| *G06Q 50/00* | (2012.01) |

(52) U.S. Cl.
CPC .......... *G06F 16/986* (2019.01); *G06Q 50/01* (2013.01); *H04L 65/1069* (2013.01); *H04L 67/02* (2013.01); *H04L 67/10* (2013.01); *H04L 67/22* (2013.01); *H04L 67/306* (2013.01); *H04L 67/42* (2013.01)

(58) Field of Classification Search
CPC ............... G06F 17/2247; G06F 17/212; G06F 17/3089; G06F 17/30994; G06F 3/0481; H04L 65/1069; H04L 67/2823; H04L 67/327

USPC .................................................. 709/217, 218
See application file for complete search history.

(56) References Cited

U.S. PATENT DOCUMENTS

| | | | | |
|---|---|---|---|---|
| 2014/0258836 | A1* | 9/2014 | Horton | G06F 17/212 715/234 |
| 2014/0298159 | A1* | 10/2014 | Kim | G06F 17/2247 715/234 |
| 2015/0178253 | A1* | 6/2015 | Kim | G06F 17/212 715/234 |

* cited by examiner

*Primary Examiner* — Wing F Chan
*Assistant Examiner* — Andrew Woo
(74) *Attorney, Agent, or Firm* — Schwegman Lundberg & Woessner, P.A.

(57) ABSTRACT

This disclosure provides for a client-server paradigm where a client requests one or more web pages from a server. A web page may include one or more web modules to be instantiated by the client. In addition, the web page may be defined according to a layout, which includes one or more identifiers that indicate where a corresponding web module should be located and/or displayed. As the web modules are being received and rendered by the client, the web modules are initially hidden from view. At periodic intervals of rendering the web page, the client modifies the page's Document Object Model to insert the received web modules. At or about the same time, the client also causes the web modules to become visible. As a web module executes, it may communicate one or more events, which other web modules can use as a signal to display and/or generate associated content.

15 Claims, 8 Drawing Sheets

CLIENT-SIDE MODULARIZATION OF A REQUESTED WEBPAGE

CROSS-REFERENCE TO RELATED APPLICATIONS

This application claims the benefit of priority to U.S. Pat. App. No. 62/368,662, filed Jul. 29, 2016 and titled "CLIENT-SIDE MODULARIZATION OF A REQUESTED WEBPAGE." which is incorporated by reference herein in its entirety.

TECHNICAL FIELD

The subject matter disclosed herein generally relates to client-side modularization and, in particular, to instantiating multiple modules within a single webpage that independently operate without having to continuously render the webpage.

BACKGROUND

An online social networking service provides a platform whereby a member of the social networking service may connect with other members of the social networking service. The social networking service provides a number of services to the member, such as job seeking services, job hosting services, member profile services, job history services, resume building services, and other such services. From interacting with these services, the social networking service stores information provided by members in a corresponding member profile.

To access the social networking service, a member typically uses a web browser or other programmatic client. When the web browser connects with the social networking service, the web browser sends one or more requests to the social networking service using an Internet-capable protocol, such as the Hypertext Markup Language Protocol (HTTP), for a webpage to begin the member's session with the social networking service. The webpage may be written using one or more computer-programming and/or computer-scripting languages, such as JavaScript, Cascading Style Sheets (CSS), the Hypertext Markup Language (HTML), and other languages.

Furthermore, the webpage may include robust and/or dynamic content to enhance the member's experience with the social networking service. However, to fully render the webpage, the web browser typically sends multiple requests to the social networking service's Web server. This results in significant delays in the web browser rendering the webpage and providing the webpage in its fully functional form. Finally, as a webpage may include third-party content or modules, the web browser spends a non-trivial amount of time in communicating with the third-party content or modules to complete their instantiation or execution on the requested webpage.

BRIEF DESCRIPTION OF THE DRAWINGS

Some embodiments are illustrated by way of example and not limitation in the figures of the accompanying drawings.

DETAILED DESCRIPTION

Figure 1:
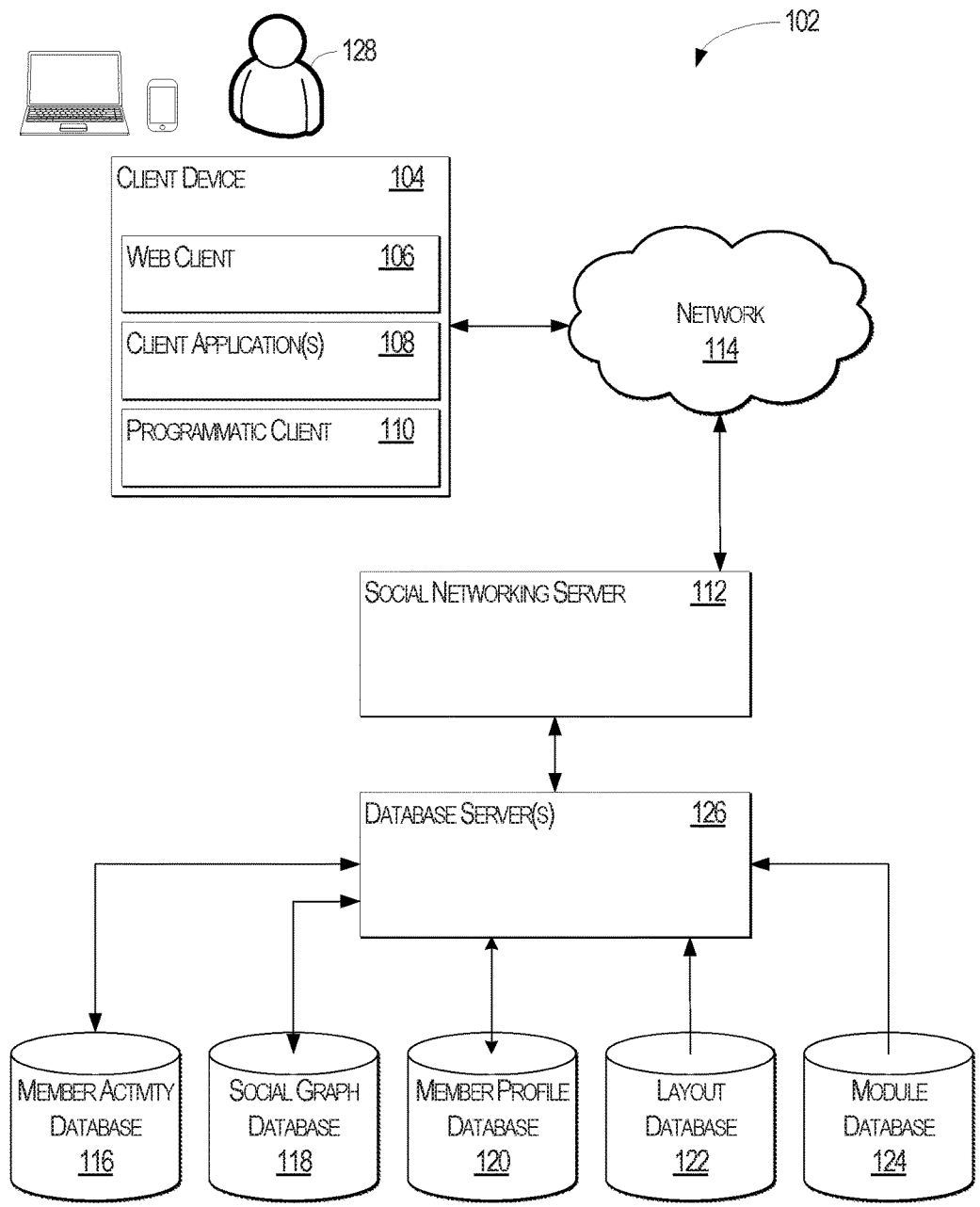
FIG. 1 is a block diagram illustrating a networked system, according to some example embodiments, including a social networking server.

Example methods and systems are directed to client-side modularization of a requested web page. The modularization of the requested web page results in a client (e.g., a web browser) receiving one or more web modules that operate independently and communicate with each other through one or more events. Accordingly, in one embodiment, this disclosure provides for a system that includes a machine-readable medium storing computer-executable instructions, and at least one hardware processor communicatively coupled to the machine-readable medium that, when the computer-executable instructions are executed, configures the system to communicate a request for a web page, receive a notification that a first transfer type is supported for sending the web page, and establish a connection according to the first transfer type for receiving the web page. The system is also configured to receive a layout of the requested web page, the layout identifying one or more locations where a web module is to be instantiated, receive a plurality of web modules, each web module to be instantiated at corresponding locations selected from the one or more locations identified by the received layout, and modify a Document Object Model of the requested web page to move a web module selected from the plurality of web modules to its corresponding location. The system is further configured to execute the one or more of the web modules selected from the plurality of web modules.

In another embodiment of the system, the system is further configured to append one or more web modules selected from the plurality of web modules as one or more leaf nodes to the Document Object Model of the requested web page.

In a further embodiment of the system, the system is further configured to instantiate an event listener that listens for events communicated by one or more web modules selected from the plurality of web modules, and the event listener is configured to maintain an event queue of events communicated by the one or more web modules.

In yet another embodiment of the system, one or more of the web modules selected from the plurality of web modules are each associated with a hidden tag that hides the web module from view, and the hidden tag is removed from a corresponding web module based on the modification of the Document Object Model of the requested web page.

In yet a further embodiment of the system, at least one web module selected from the plurality of web modules is associated with a Document Object Model identifier that identifies the at least one web module, and the received layout includes the Document Object Model identifier to identify the location where the at least one web module is to be instantiated.

In another embodiment of the system, at least one web module selected from the plurality of web modules is assigned a first state selected from a plurality of states associated with the at least one web module, the first state identifying the behavior of the at least one web module.

In a further embodiment of the system, the at least one web module is configured to change from the first state to a second state selected from the plurality of states in response to at least one interaction with the at least one web module, and the at least one web module communicates an event in response to the change in the first state to the second state.

This disclosure also describes a method that includes communicating a request for a web page, receiving a notification that a first transfer type is supported for sending the web page, establishing a connection according to the first transfer type for receiving the web page, and receiving a layout of the requested web page, the layout identifying one or more locations where a web module is to be instantiated. The method also includes receiving a plurality of web modules, each web module to be instantiated at corresponding locations selected from the one or more locations identified by the received layout, modifying a Document Object Model of the requested web page to move a web module selected from the plurality of web modules to its corresponding location, and executing the one or more of the web modules selected from the plurality of web modules.

In another embodiment of the method, the method includes appending one or more web modules selected from the plurality of web modules as one or more leaf nodes to the Document Object Model of the requested web page.

In a further embodiment of the method, the method includes instantiating an event listener that listens for events communicated by one or more web modules selected from the plurality of web modules, and the event listener is configured to maintain an event queue of events communicated by the one or more web modules.

In yet another embodiment of the method, one or more of the web modules selected from the plurality of web modules are each associated with a hidden tag that hides the web module from view; and the method further comprises, removing the hidden tag from a corresponding web module based on the modification of the Document Object Model of the requested web page.

In yet a further embodiment of the method, at least one web module selected from the plurality of web modules is associated with a Document Object Model identifier that identifies the at least one web module, and the received layout includes the Document Object Model identifier to identify the location where the at least one web module is to be instantiated.

In another embodiment of the method, at least one web module selected from the plurality of web modules is assigned a first state selected from a plurality of states associated with the at least one web module, the first state identifying the behavior of the at least one web module.

In a further embodiment of the method, the at least one web module is configured to change from the first state to a second state selected from the plurality of states in response to at least one interaction with the at least one web module, and the at least one web module communicates an event in response to the change in the first state to the second state.

This disclosure further provides for a computer-readable memory having instructions stored thereon that, when executed by one or more hardware processors, causes a system to perform a plurality of operations that include communicating a request for a web page, receiving a notification that a first transfer type is supported for sending the web page, establishing a connection according to the first transfer type for receiving the web page, and receiving a layout of the requested web page, the layout identifying one or more locations where a web module is to be instantiated. The plurality of operations also includes receiving a plurality of web modules, each web module to be instantiated at corresponding locations selected from the one or more locations identified by the received layout, modifying a Document Object Model of the requested web page to move a web module selected from the plurality of web modules to its corresponding location, and executing the one or more of the web modules selected from the plurality of web modules.

In another embodiment of the computer-readable memory, the plurality of operations further includes appending one or more web modules selected from the plurality of web modules as one or more leaf nodes to the Document Object Model of the requested web page.

In a further embodiment of the computer-readable memory, the plurality of operations further includes instantiating an event listener that listens for events communicated by one or more web modules selected from the plurality of web modules, and the event listener is configured to maintain an event queue of events communicated by the one or more web modules.

In yet another embodiment of the computer-readable memory, one or more of the web modules selected from the plurality of web modules are each associated with a hidden tag that hides the web module from view, and the plurality of operations further comprises removing the hidden tag from a corresponding web module based on the modification of the Document Object Model of the requested web page.

In yet a further embodiment of the computer-readable memory, at least one web module selected from the plurality of web modules is associated with a Document Object Model identifier that identifies the at least one web module, and the received layout includes the Document Object Model identifier to identify the location where the at least one web module is to be instantiated.

In another embodiment of the computer-readable memory, at least one web module selected from the plurality of web modules is assigned a first state selected from a plurality of states associated with the at least one web module, the first state identifying the behavior of the at least one web module, the at least one web module is configured to change from the first state to a second state selected from the plurality of states in response to at least one interaction with the at least one web module, and the at least one web module communicates an event in response to the change in the first state to the second state.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on client device 104. The social networking server 112 is further communicatively coupled with one or more database servers 124 that provide access to one or more databases 116-124.

The client device 104 may comprise, but is not limited to, a mobile phone, desktop computer, laptop, portable digital assistants (PDAs), smart phone, tablet, ultra book, netbook, laptop, multi-processor system, microprocessor-based or programmable consumer electronic, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 128 that is used to perform one or more searches for user profiles accessible to, or maintained by, the social networking server 112.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 128, to identify or locate other connected members, etc.). Conversely if the social networking access client is not included in the client device 104, the client device 104 may use its web browser to access the initialization and/or search functionalities of the social networking server 112.

One or more users 128 may be a person, a machine, or other means of interacting with the client device 104. In example embodiments, the user 128 is not part of the network architecture 102, but may interact with the network architecture 102 via the client device 104 or other means. For instance, the user 128 provides input (e.g., touch screen input or alphanumeric input) to the client device 104 and the input is communicated to the client-server-based network architecture 102 via the network 114. In this instance, the social networking server 112, in response to receiving the input from the user 128, communicates information to the client device 104 via the network 114 to be presented to the user 128. In this way, the user 128 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with other one or more database server(s) 126 and/or database(s) 116-124. In one embodiment, the social networking server 112 is communicatively coupled to a member activity database 116, a social graph database 118, a member profile database 120, a layout database 122, and a module database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some embodiments, when a person initially registers to become a member of the social networking service provided by the social networking server 112, the person is prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each member shares a connection in common with the other member, but the members are not directly connected to one another. In one embodiment, the social graph maintained by the social networking server 112 is stored in the social graph database 118.

Although the foregoing discussion refers to "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

The layout database 122 stores one or more layout configuration files for defining the layout of a corresponding webpage. In one embodiment, a layout configuration file defines the portions and/or sections of a webpage for the type and/or substance of content that is to appear in a defined portion and/or section of the webpage. In this manner, one or more webpages provided by the social networking server 112 may each be associated with a corresponding layout configuration file. Alternatively and/or additionally, a layout configuration file corresponds to more than one webpage.

In one embodiment, a layout configuration file is associated with one or more layout properties. In this regard, a layout property specifies a characteristic of the associated layout configuration file. Examples of layout properties include, but are not limited to, a layout function type that specifies the function of the layout, a layout browser type that indicates the web browser in which the layout should be displayed, and a layout member type that indicates the type of member for which the layout is intended. An example combination of layout property values include "homepage," "desktop," and "company administrator," which indicates that the associated layout is for the homepage of a member that is an administrator of a company, which is to be displayed on a desktop web browser. Another example combination of layout property values include "invitation," "mobile," and "standard member," when indicates that the associated layout is for sending invitations to other members for a standard member of the social networking service, which is to be displayed within a mobile web browser. In this manner, the various combinations of layout property values can be used to select one or more of the layout configuration files.

Furthermore, the layout database 122 includes one or more layout configuration templates, which an administrator or maintainer of a webpage or micro-site provided by the social networking server 112 (e.g., a company's webpage or collection of webpages) may use to construct one or more layout configuration files. In this regard, the layout configuration templates may be generic and define the type of content to instantiate or display within a given portion or section of a webpage, whereas a constructed layout configuration file may specifically identify the content to display or instantiate within the given portion or section corresponding to the content type identified by the layout configuration template. As discussed below, the selection of which layout configuration file to communicate to the client device 104 may be dependent upon the resolution of one or more local and/or remote measures communicated from the client device 104 to the social networking server 112. In various embodiments, the layout configuration file is written using one or more computer-programming and/or computer-scripting languages such as JavaScript Object Notation (JSON), YAML Ain't Markup Language (YAML), Extensible Markup Language (XML), and other such languages or combination of languages.

A module database 124 provides access to one or more modules which may be retrieved by the social networking server 112 and communicated to the client device 104. The modules stored within the module database 124 provide various functionalities and features for engaging with the social networking service provided by the social networking server 112. In one embodiment, the modules stored within the module database 124 are designed to provide a given feature or functionality. For example, the module database 124 may include a module that provides updates about a member's connections, a module that facilitates the uploading and/or editing of a member's profile selected from the member profile database 120, a module that retrieves news or other items of interest for a member's profile, a module that facilitates searching for content provided by the social networking server 112, and other such modules. In summary, the modules stored in the module database 124 may provide one or more functionalities that enhance a member's experience with the social networking service.

In one embodiment, the modules of the module database 124 are implemented under the Web Component framework, which defines a framework for implementing web-based applications that execute within a web browser and can operate independently. Modules that are developed under the Web Component framework are generally referred to as "web components." As of the time of this disclosure, the framework for Web Components is still being developed by the World Wide Web Consortium (W3C), but it is generally recognized as comprising five components: templates, decorators, custom elements, shadow DOM, and imports. One of the technical benefits of implementing the modules as web components is that a web component fully encapsulates all of its own HTML and CSS. With this type of encapsulation, a web browser (e.g., the web client 106) will render a web component as the developer intended. In addition, the web component operates independently and free from interference from externally executing JavaScript. Various programming libraries are available for implementing web components and include, but are not limited to, Polymer, X-Tag, Bosonic, and other such libraries or combination of libraries.

As discussed below, the social networking server 112 retrieves one or more modules from the module database 124 according to the layout configuration file associated with a requested webpage. Furthermore, as the requested webpage and/or layout configuration file may be implemented in JSON or other asynchronous computer-programming and/or computer-scripting language, the web browser 106 rendering the webpage also renders the retrieved modules without reloading the requested webpage. In this manner, the web browser 106 displays the substantive portions of the requested webpage as they are being loaded. This asynchronous feature significantly reduces the latency typically experienced with traditional methods of webpage development and deployment, which is a technical problem unique to this field.

In one embodiment, the social networking server 112 communicates with the various databases 116-124 through one or more database server(s) 126. In this regard, the database server(s) 126 provide one or more interfaces and/or services for providing content to, modifying content in, removing content from, or otherwise interacting with, the databases 116-124. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the social networking server 112 communicates with the databases 116-124 and includes a database client, engine, and/or module, for providing data to, modifying data stored within, and/or retrieving data from, the one or more databases 116-124.

While the database server(s) 126 is illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol ("LDAP") server, a MySQL database server, or any other server configured to provide access to one or more of the databases 116-122, or combinations thereof. Accordingly, and in one embodiment, the database server(s) 126 implemented by the social networking service are further configured to communicate with the social networking server 112.

Figure 2:
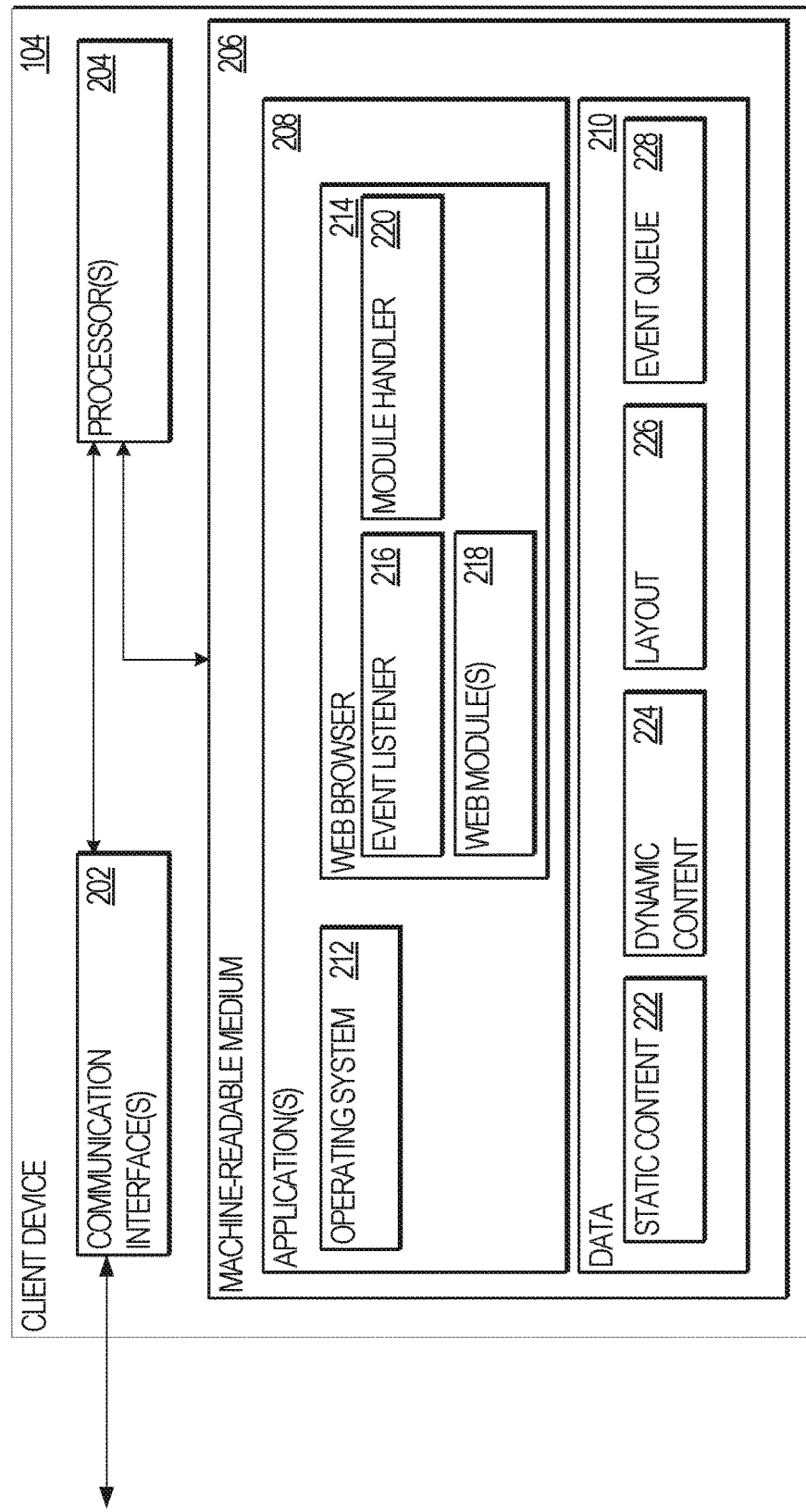
FIG. 2 illustrates the client device of FIG. 1, according to an example embodiment.

FIG. 2 illustrates the client device 104 of FIG. 1 in accordance with an example embodiment. In one embodiment, the client device 104 includes one or more processor(s) 204, one or more communication interface(s) 202, and a machine-readable medium 206 that stores computer-executable instructions for one or more applications 208 and data 210 used to support one or more functionalities of the applications 208.

The various functional components of the client device 104 may reside on a single device or may be distributed across several computers in various arrangements. The various components of the social client device 104 may, furthermore, access one or more databases (e.g., databases 116-124 or any of data 210), and each of the various components of the client device 104 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the client device 104, the social networking server 112, and one or more of the database server(s) 126 and/or databases 116-124. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The machine-readable medium 206 includes various applications 208 and data 210 for implementing the client device 104. The machine-readable medium 206 includes one or more devices configured to store instructions and data temporarily or permanently and may include, but are not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the applications 208 and the data 210. Accordingly, the machine-readable medium 206 may be implemented as a single storage apparatus or device, or, alternatively and/or additionally, as "cloud-based" storage systems or storage networks that include multiple storage apparatus or devices. As shown in FIG. 2, the machine-readable medium 206 excludes signals per se.

In one embodiment, the applications 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the applications 208 of the client device 104 include, but are not limited to, an operating system 212 and a web browser 214. While the client device 104 may include alternative and/or additional applications (e.g., a networking application, a printing application, a software-implemented keyboard, etc.), such alternative and/or or additional applications are not germane to this disclosure and the discussion of such is hereby omitted for brevity and readability.

The web browser 214 instantiates various components 216-220 for rending a webpage accessible via the social networking server 112. These components 216-220 include, but are not limited to, an event listener 216, one or more web module(s) 218, and a module handler 220. While the web browser 214 may include alternative and/or additional components (e.g., a rendering engine, a memory manager, a socket manager, etc.), a discussion of these alternative and/or additional components have been omitted for brevity and readability.

The data 210 referenced and used by the applications 208 include various types of data in support of rending a webpage having one or more independently operating modules. The data 210 includes, but is not limited to, static content 222, dynamic content 224, one or more layout(s) 226, and an event queue 228. As discussed in more detail below, the static content 222 includes content for a webpage that remains largely unchanged during the interactions with the webpage, the dynamic content 224 includes content that is subject to change, and, which may change during interactions with the page, the layout(s) 226 define the structure and organization for a corresponding webpage (or webpages), and the event queue 228 handles the distribution and collection of events transmitted (e.g., "fired") from one or more of the web module(s) 218.

The operating system 212 instantiates the environment in which the web browser 214 executes. The operating system 212 may be any mobile and/or desktop operating system, which is executed by one or more of the processor(s) 204. Examples of operating systems that may be executed by the processor(s) 204 include Google Android®, Apple iOS®, Blackberry® OS, Microsoft Windows® 10 Mobile, and other such operating systems. As one of ordinary skill in the art will appreciate, the operating system 212 provides a human/machine interface for interacting with the client device 104 and, further still, provides an environment in which the web browser 214 executes.

The web browser 214 is configured to communicate with the social networking server 112. In communicating with the social networking server 112, the web browser 114 may request and receive one or more webpages associated with a social networking service provided by the social networking server 112.

Conventionally, a webpage may include static content (e.g., non-changing content) and dynamic content generated by a server at the time of the request for the webpage (e.g., a current time, a date, etc.). In this conventional implementation, the web browser 214 is said to communicate "synchronously" with the social networking server 112, where the web browser 214 is configured to display the content of the webpage after the content has been completely received from the social networking server 112 and the web browser 214 receives a message from the social networking server 112 indicating that there is no more content for the requested webpage (e.g., such as a message with the tag of "</HTML>", indicating that the end of the webpage has been reached).

However, the present disclosure contemplates the asynchronous transfer of webpages from the social networking server 112 to the web browser 214. Asynchronous transfer is technically beneficial because the web browser 214 can render the webpage as the content for the webpage is being received. In addition, the requested webpages include independently operating programs (e.g., web modules 218) that are instantiated by the web browser 214 at the time the requested webpage is rendered. In an asynchronous transfer of a webpage, the social networking server 112 transmits the webpage using chunked transfer coding, which is defined and explained in RFC 2616, "HTTP/1.1," which is available from received the Internet Engineering Task Force at https://tools.ietf.org/html/rfc2616. Chunked transfer coding is one transfer type that may be supported by the social networking server 112. In summary, with chunked transfer coding, a webpage (or other electronic file) is transmitted in "chunks," and a chunk may be defined by an initial chunk identifier and an ending chunk identifier. Thus, the chunk identifiers inform the web browser 214 the beginning and ending of a given chunk. With chunked transfer coding, the web browser 214 may maintain a persistent connection with the social networking server 112 such that additional chunks can be sent from the social networking server 112 (or requested by the web browser 214), which is useful when a web module is designed to maintain a persistent connection with the social networking server 112 (or other datastore).

To accommodate the asynchronous transfer of webpages from the social networking server 112, the web browser 214 initially receives a layout 226 that defines the structure of the requested webpage. As known to one of ordinary skill in the art, a webpage is structured according to a Document Object Model (DOM), which defines the logical structure of the requested webpage and the way the requested webpage is accessed and manipulated. The layout 226 may be obtained from the layout database 122, which, as explained above, includes layout configuration files for associated webpages. In one embodiment, the layout 226 employs unique identifiers for identifying where in the requested webpage an associated web module is to appear. Thus, regardless of the order in which a web module is received (e.g., via chunked transfer coding), the web browser 214 can identify where in the webpage the received web module is to appear on the display of the client device 104. In this manner, the web browser 214 can display web modules as they are received rather than in the order in which the web module appears in the requested webpage. In one embodiment, the web browser 214 periodically restructures and writes to the DOM of the requested webpage, which causes the web module(s) 218 that have been received to be displayed on the display of the client device 104.

Figure 3:
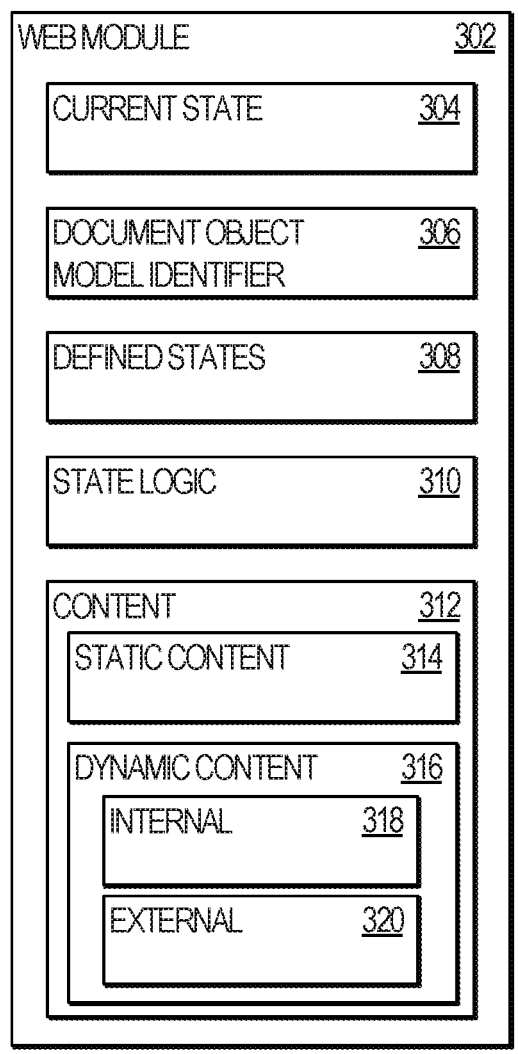
FIG. 3 illustrates the structure of a web module according to an example embodiment.

FIG. 3 illustrates the structure of a web module 302 according to an example embodiment. The web module 302 may be one of the web modules 218 received by the client device 104 and executed by one or more of the processor(s) 204. In one embodiment, the web module 302 is defined by a current state 304, DOM identifier 306, one or more defined states 308, state logic 310 for transitioning between the one or more defined states 308, and content 312, which may include static content 314 and/or dynamic content 316. The components illustrated in FIG. 3 are by way of example and without limitation, and different web modules may implement alternative and/or additional components.

As a web module 302 of the instant disclosure may operate independently, the web module 302 is defined by a current state 304 selected from one or more of the defined states 308. A state identifies the status of the web module 302 and, when applicable, the actions or operations the web module 302 is to perform while in a given state. The state may further identify the content the web module 302 is to display and/or act upon. Examples of defined states 308 may include RUNNING, RETRIEVING, STOPPING, STOPPED, CHANGING, PAUSED, or other such states and/or combination of states.

To change from a first state to a second state, the web module 302 includes state logic 310. The state logic 310 includes the conditions (e.g., conditional statements and/or Boolean logic) associated with instructions that inform the web module 302 when it should change from a current state 304 to a state selected from one or more of the defined states 308. In one embodiment, the state logic 310 causes the web module 302 to act in response to events communicated by other modules (e.g., on or more of the web module(s) 218) and/or in response to actions performed by the user 128 interacting with the client device 104. Further still, the state logic 310 may cause the web module 302 to act in response to data and/or content received from datastores in communication with the client device 104, such as the member activity database 116, the social graph database 118, the member profile database 120, or other such datastore or combination of datastores.

In one embodiment, the web module 302 retrieves content 312 to display on the requested web page. The content 312 retrieved by the web module 302 may be stored in one or more datastores, such as in one or more of the databases 116-124 illustrated in FIG. 1. Alternatively, the content 312 may be derived and/or obtained by manipulating and/or evaluating the data stored in one or more of the databases 116-124. In this regard, content 312 includes any audiovisual content displayable on the requested webpage or data that the web module 302 may retrieve and/or act upon in performing one or more of its operations. The content 312 may include static content 314 and/or dynamic content 316. In general, static content 314 includes content for the web module 302 that may not change or rarely change. Examples of static content 312 include text, graphics, sound, font type, font size, the formatting used in defining displayed audio and/or visual content, Cascading Style Sheets (CSS) content, and other such static content.

Dynamic content 316 includes content that may change from different instantiations and/or executions of the web module 302. Dynamic content 316 also includes content retrievable from, or dependent on, data provided by other web modules 218. In one embodiment, the dynamic content 316 includes internal dynamic content 318 and external dynamic content 320. Internal dynamic content 316 includes dynamic content generated by the web module 302 without relying on data provided by external data sources (e.g., one or more of the databases 116-124). External dynamic content 320 includes dynamic content generated from external data sources (e.g., one or more of the databases 116-124). The external dynamic content 320 may also include content generated in response to events from other web module(s) 218. In this manner, the web module 302 may include many different types of content, depending on the usage and/or operations to be performed by the web module 302.

The web module 302 also includes a DOM identifier 306 that uniquely identifies the web module 302. The DOM identifier 306 is referenced by the layout 226, which is used to indicate the location in the web page where the web module is to appear. In one embodiment, each web module(s) 218 stored by the module database 124 is associated with a unique DOM identifier. Having unique DOM identifiers assigned to corresponding web module(s) 218 ensures that the correct web module is instantiated and/or referenced by the layout 226 when the requested webpage is transferred to the client device 104. In other words, unique DOM identifiers ensures that the correct web module(s) 218 are communicated to, and instantiated by, the client device 104.

Referring back to FIG. 2, and in addition to the web module(s) 218, the web browser 214 may also instantiate an event listener 216 and a module handler 220. In one embodiment, the event listener 216 and module handler 220 are instantiated via instructions contained within the requested web page. In this manner, the web browser 214 may instantiate multiple different event listeners 216 and module handlers 220, depending upon the number of web pages being managed by the web browser 214. Additionally, and/or alternatively, the web browser 214 may instantiate an event listener 216 and/or module handler 220 that monitor the various web module(s) 218 for multiple different webpages.

As explained above, the web browser 214 may be in asynchronous communication with the social networking server 112. The module handler 220 is configured to manipulate the DOM of the requested web page and to move and/or insert the received web module(s) 218 to their respective locations within the DOM. Assuming that the DOM of the requested web page is implemented as a tree data structure, where nodes of the DOM represent elements of the requested web page, the asynchronous communication with the social networking server 112 may result in requested web module(s) 218 being added as nodes to the tree data structure in a location different than their intended location. For example, the web browser 214 may add the requested web module(s) 218 as leaf nodes for expediency, depending on the amount of time (e.g., latency) involved in requesting content for the requested web page.

As a web module may be residing in another datastore than the requested web page, it is foreseeable that the web browser 214 receives some content, such as static content 222, earlier in time than other content, such as the dynamic content 224 or the requested web module(s) 218. To reduce latency in the display of the requested web page, the web browser 214 may be configured to display the content that it has received, rather than waiting for an instruction from the social networking server 112 that all of the content for the requested web page has been transmitted. However, under this model, there may be circumstances where a received web module is displayed at location on the requested web page other than its intended location. To prevent unwanted interaction with the received web module, the layout 226 may associate a "hidden" HTML tag with the web module. At the time of this disclosure, the "hidden" HTML tag is a feature of HTML5, which indicates that associated content is to be hidden from view.

Accordingly, in one embodiment, the web browser 214 "flushes" the received content such that it is displayed on a display of the client device 104. To accommodate these periodic flushes, the module handler 220 is configured to insert the received module(s) 218 into their designated location within the DOM of the requested web page. In one embodiment, the module handler 220 accomplishes this task by referencing the DOM identifier referenced by the received layout 226 and the DOM identifiers each associated with the received web module(s) 218 (e.g., one or more DOM identifiers 306). Thus, when the flush of the received content occurs (or prior to such flushing) the received web module(s) 218 are located at their designated location within the received web page. The module handler 220 may perform this restructuring of the DOM for the requested web page at periodic intervals, when a given condition occurs (e.g., the "flush" instruction is received from the web browser 214), or a combination thereof. In addition, where the "hidden" HTML tag is associated with a given web module, the module handler 220 is configured to edit the HTML source code to remove this "hidden" HTML tag. By removing the "hidden" HTML tag, the associated web module becomes displayable by the web browser 214.

As the web module(s) 218 are being instantiated on the requested web page, one or more of the web module(s) 218 may communicate "events" that signal that a particular action has occurred. In general, an event signals that a certain condition or action has been performed. In addition, it is customary for the programmer of a given web module to specify the event(s) that the web module sends out. While there may be a general set of events that a programmer may reference (e.g., one or more of the events as defined by the JavaScript API), the programmer may further write and/or create his or her own events that the corresponding web module triggers. To notify other programmers and developers of web modules, the instant programmer may publish an API or other event listing that specifies the events that his or her web module communicates. In this way, each web module is an application unto itself and the behavior of such web module is left up to the individual programmer.

In one embodiment, and to accommodate the different events that may be communicated and/or triggered by the various web module(s) 218, the web browser 214 implements an event listener 216 that listens for the events that are communicated by the various web module(s) 218. As events as communicated by the web module(s) 218, the event listener 216 stores the events in an event queue 228. The event queue 228 represents a central repository (e.g., a 1- or 2-dimensional array), of events that are communicated by the various web modules(s) 218. By implementing an event listener 216 with a corresponding event queue 228, the developer or programmer of the web module(s) 218 simply designates the event listener (or the web browser 214) as the handler for a given event. Other web module(s) 218 then query the event queue 228 as to whether a given event has occurred. Alternatively, and/or additionally, the event listener 216 may also be configured as an event broadcaster that announces which event(s) have occurred to the various web module(s) 218. As the web module(s) 218 are designed to individually operate, a given web module may instantiate its own event listener to listen for events broadcast by the event listener 216 of the web browser 214. In this manner, the event listener 216 functions as a central event communications hub that may then broadcast events to other web module(s) 218 as the events occur This feature is technical beneficial because it streamlines the event publication and reception process, which allows developers and programmers to create web module(s) 218 more expeditiously than in the past.

Figure 4A:
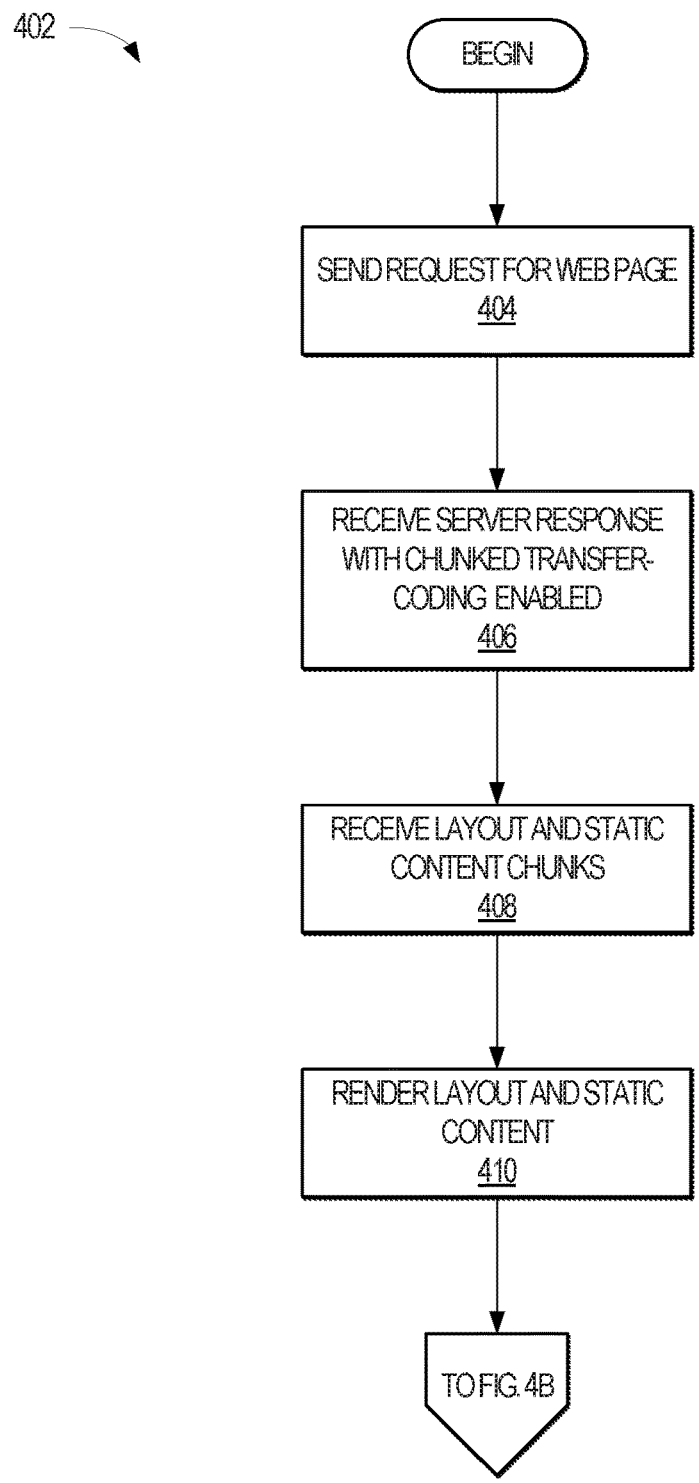
FIGS. 4A-4B illustrate a method, in accordance with an example embodiment, for rendering a requested web page on the client device of FIG. 1.
Figure 4B:
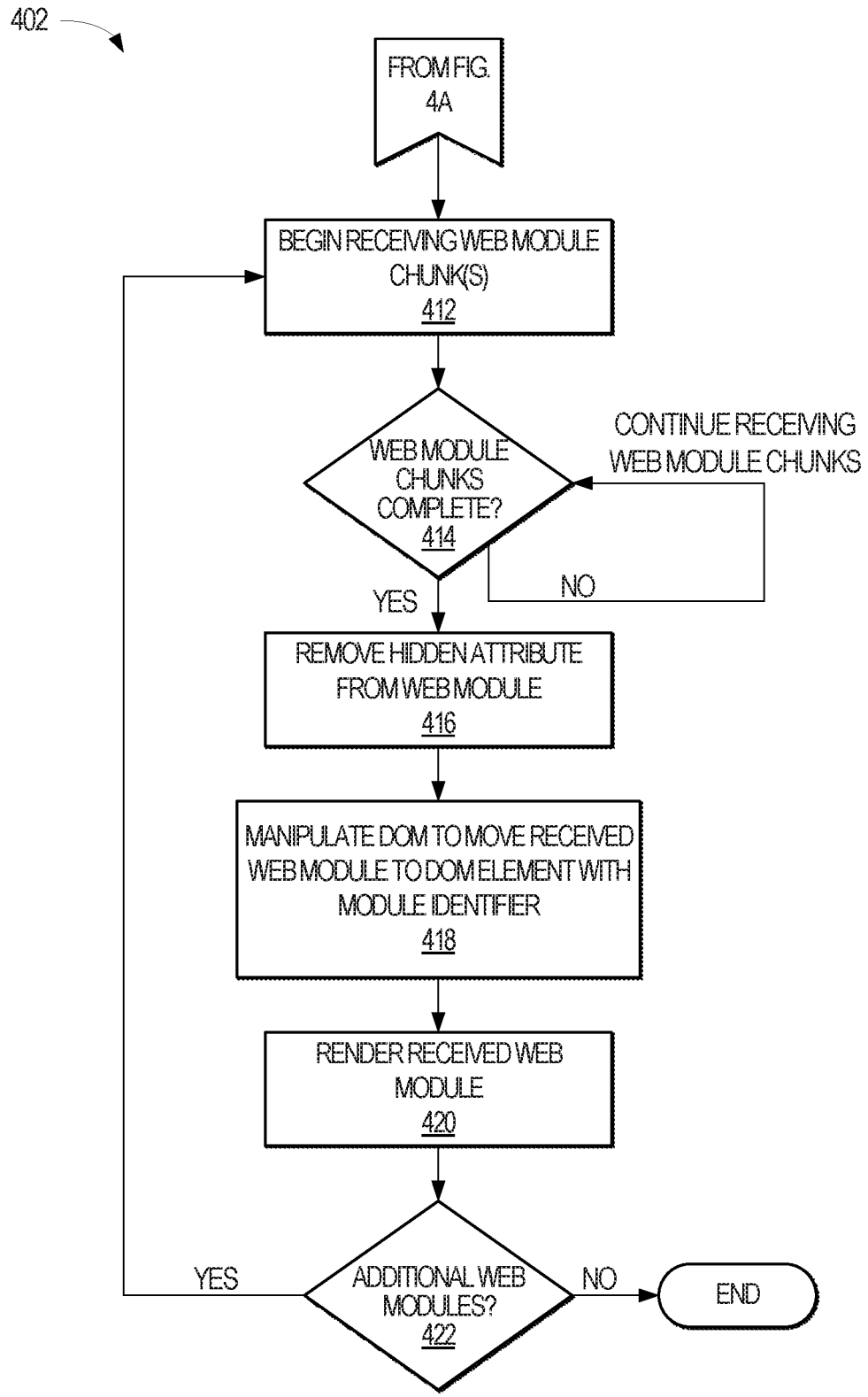

FIGS. 4A-4B illustrate a method 402, in accordance with an example embodiment, for rendering a requested web page on the client device of FIG. 1. The method 402 may be implemented by one or more of the modules and/or components of the client device 104 and discussed by way of reference thereto.

Initially, the client device 104 communicates a request for a web page provided by the social networking server 112 (Operation 404). In turn, the social networking server 112 communicates a response to the client device 104 indicating that the social networking server 112 supports the chunked transfer coding of web pages (Operation 406). As explained above with reference to FIG. 2, chunked transfer coding is a feature that supports streaming of the web page (and its associated content) from the social networking server 112 to the client device 104, which is useful in instances where the content for the requested web page may be originating from one or more datastores. As the social networking server 112 may not know the exact amount of data being communicated to the client device 104, chunked transfer coding facilitates the communication of this unknown amount of content.

In transmitting the requested web page to the client device 104, the social networking server 112 may initially communicate a layout and static content for rendering the web page. As discussed above with reference to FIG. 2, the client device 104 may store the layout as the layout 226 and the static content as static content 222 (Operation 408). In one embodiment, the web browser 214 initially renders the static content 222 according to the layout 226 (Operation 410). Additionally, and/or alternatively, the web browser 214 may render portions of the static content 222 and/or layout 226 according to transferred chunks that the client device 104 receives from the social networking server 112. In this manner, the web browser 214 is configured to display portions of the requested web page as the content for those portions are received. This behavior results in the user 128 experiencing less delay in the viewing of the requested web page than in conventional arrangements.

Referring to FIG. 4B, the social networking may then begin transferring chunks of the one or more web module(s) to be displayed on the requested web page. Accordingly, as shown in FIG. 4B, the client device 104 receives the web module chunk(s) (Operation 412). The web browser 214 then waits until an identifier has been received with the received chunks indicating that a web module has been transferred (Operation 414). Where the identifier has not been received (e.g., the "NO" branch of Operation 414), the web browser 214 continues receiving the content stream from the social networking server 112. Where the identifier has been received (e.g., the "YES" branch of Operation 414), the method 402 proceeds to Operation 416.

As explained above, upon completion of the transfer of the web module, the web browser 214 may initially render the web module with a "hidden" HUM, tag associated with it. In this embodiment, the received web module does not appear visible to the user 128. Periodically, the web browser 214 flushes the received web modules (e.g., web module(s) 218) to arrange the web module(s) 218 on the received web page according to the received layout 226. In one embodiment, the web browser 214 flushes the received web module(s) according to one or more flushing instructions written within the HTML source code of the received web page. In this embodiment, the flushing instructions may instruct the web browser 214 to flush the received web module(s) according to one or more conditions, such as after every web module is received or at periodic intervals.

When the web browser 214 executes a flush of the received web module(s) 218, the web browser 214 instructs the module handler 220 to perform a variety of actions. In one embodiment, the module handler 220 removes the "hidden" HTML tag associated with the various web module(s) 218 (Operation 416). The module handler 220 may then also manipulate the DOM of the received web page to move the web module(s) 218 into their correct locations by matching a DOM identifier contained within the layout 226 with the DOM identifier associated with a given web module (e.g., the DOM identifier 306 as illustrated in FIG. 3) (Operation 418). The web browser 214 may then render the web module such that the web module is displayed in its correct position within the requested web page to the user 128 (Operation 420).

In one embodiment, one or more of the operations (e.g., Operations 412-420) are performed on a per module basis. Thus, at Operation 422, the web browser 214 determines whether to perform one or more of the foregoing operations on additional web modules (Operation 422). If the web browser 214 should make this determination in the affirmative (e.g., the "YES" branch of Operation 422), the method 402 returns to Operation 412. If the web browser 214 should make this determination in the negative (e.g., the "NO" branch of Operation 422), the method 402 completes.

In an alternative embodiment, one or more of the operations illustrated in FIG. 4B are performed on a plurality of web modules that the web browser 214 receives. For example, the web browser 214 make continuously perform Operations 412-414 to receive multiple modules, and then perform Operations 416-420 on each of the multiple modules. In this manner, the web browser 214 may be configured to perform one or more of the operations illustrated in FIG. 4B on multiple modules within a batch (e.g., via batch processing) rather than on individual modules as each one is received. Alternatives and/or variations in the manner in which the operations illustrated in FIGS. 4A-4B are performed are also contemplated as falling within the scope of this disclosure.

Figure 5A:
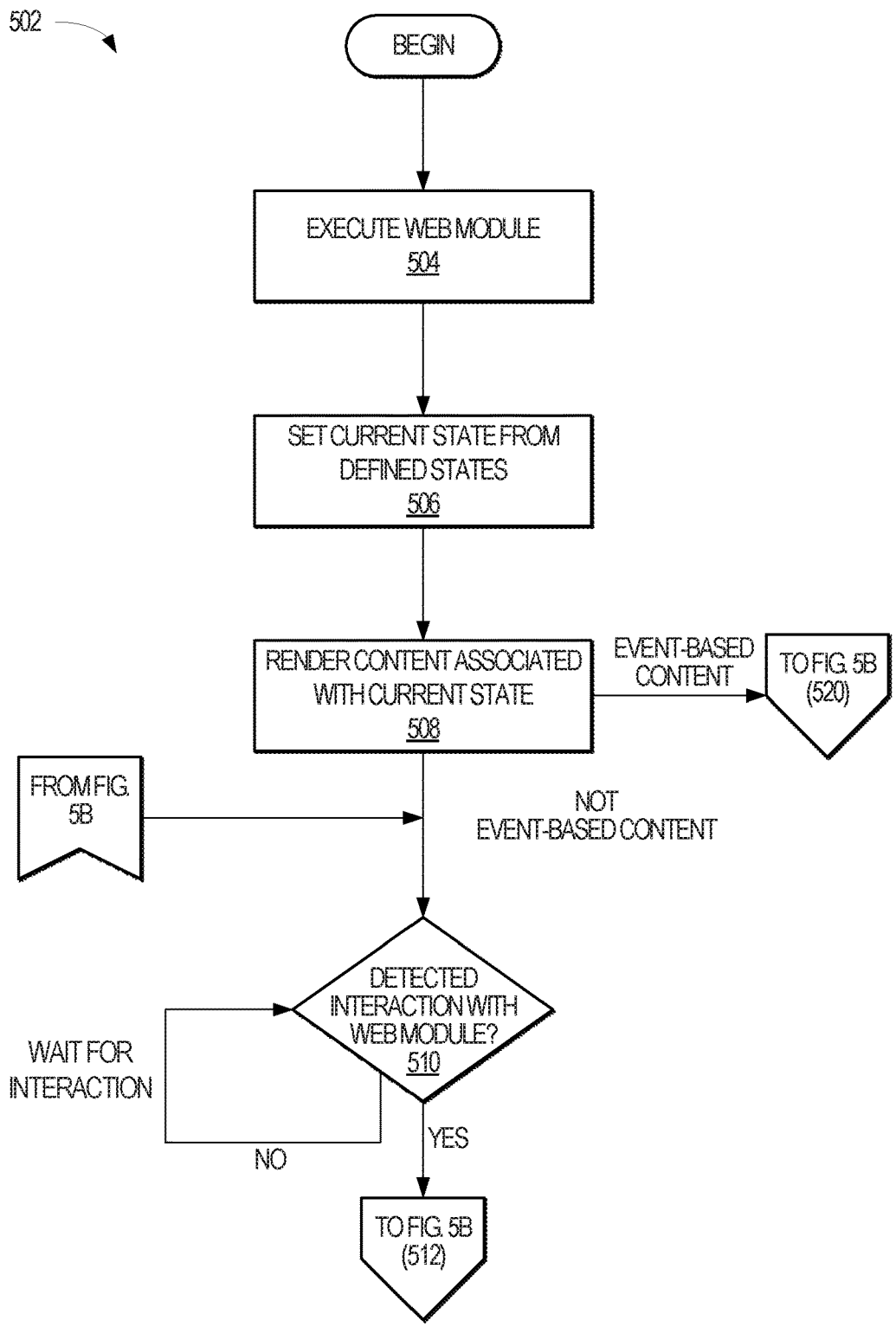
FIGS. 5A-5B illustrate a method, in accordance with an example embodiment, for instantiating and/or executing one or more web modules.
Figure 5B:
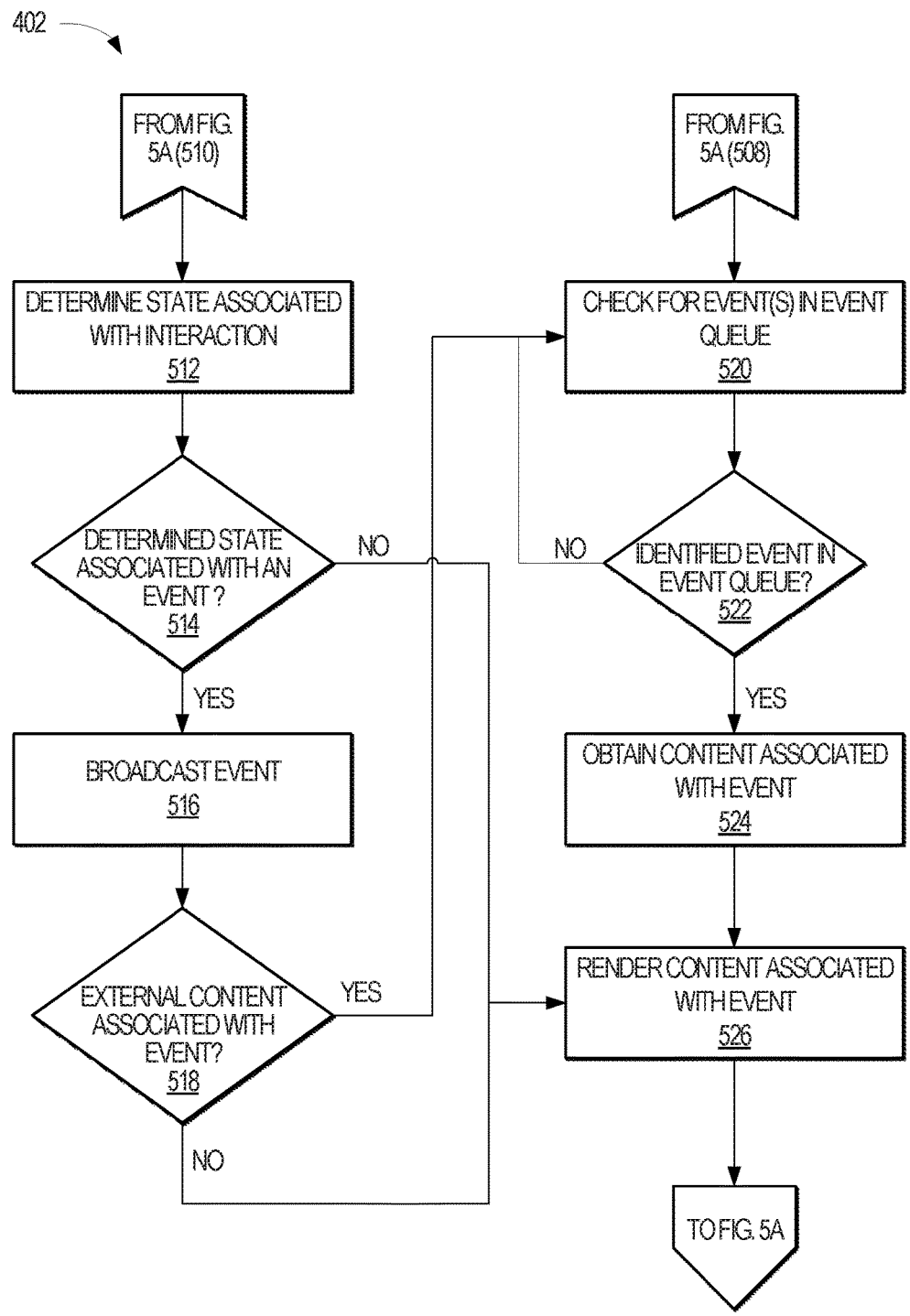

FIGS. 5A-5B illustrate a method 502, in accordance with an example embodiment, for instantiating and/or executing one or more web modules 218. Referring initially to FIG. 5A, the web browser 214 executes one or more of the web modules 218 (Operation 504). In one embodiment, a web module is initially set to a given state selected from one or more of its defined states (e.g., one or more of the defined states 308 as illustrated in FIG. 3) (Operation 506). With the current state set, the web module then renders, or acts upon, content associated with the current state (e.g., static content 314 and/or dynamic content 316) (Operation 508). Where the is content associated with an event, the method 502 proceeds to Operation 520 as illustrated in FIG. 5B (discussed further below).

Where the content is not event-based, the method 502 proceeds to Operation 510. At Operation 510 (and where applicable), the executed web module awaits for interaction by the user 128. Where there is no interaction with the web module (e.g., the "NO" branch of Operation 510), the method 502 returns to Operation 510. Where there is an interaction with the web module (e.g., the "YES" branch of Operation 510), the method 502 proceeds to Operation 512 on FIG. 5B. Of course, a web module may be designed such that no user interaction is expected, and, in this context, the method 502 may proceed to Operation 514.

At Operation 512, the web module determines a state associated with the given interaction (Operation 512). For example, the interaction may be the user 128 selecting a graphical button associated with the web module, and the state of the web module may then be set to SUBMIT. As another example, the interaction may be the user 128 moving a mouse cursor over various elements displayed by the web module, and the web module may be set to an ON-MOUSE-OVER state. Furthermore, this state may change as the user 128 continuously interacts with the web module. In this regard, multiple instantiations of one or more of the operations illustrated in FIGS. 5A-5B may occur while the user 128 is interacting with the web module.

The web module then determines whether the state determined in Operation 512 is associated with an event (e.g., an event to be broadcast/communicated by the web module). Where this determination is made in the negative (e.g., the "NO" branch of Operation 514), the method 502 proceeds to Operation 526. Where this determination is made in the affirmative (e.g., the "YES" branch of Operation 514), the web module then communicates the event associated with the interaction (Operation 516). In one embodiment, the web module broadcasts this event to one or more of the web elements (e.g., one or more of the web modules) instantiated by the web browser 214. As explained previously, the web browser 214 may also instantiate an event listener 216 and/or an event queue 228 for recording the events broadcast, and/or communicated, by the various web modules(s) 218.

The web module then determines whether external content (e.g., content retrieved and/or obtained from other web modules) is also associated with an event (Operation 518). In this context, the event described with respect to Operation 518 may be different than the event described with respect to Operations 514-516. For example, the event of Operation 518 may be an event that is broadcasted, and/or communicated, by other web modules. In alternative embodiments, the web module does not retrieve and/or obtain external content, in which case, the web module may proceed to Operation 526. Where the web module determines that there is external content to be displayed that is associated with an event (e.g., the "YES" branch of Operation 518), the web module proceeds to Operation 520. Where the web module determines that there is no external content or external content not associated with an event (e.g., the "NO" branch of Operation 518), the web module proceeds to Operation 526.

At Operation 520, the web module determines whether the event of Operation 518 is in the event queue 228. In one embodiment, the web module communicates a request to the event listener 216 to make this determination. Additionally, and/or alternatively, the event listener 216 may communicate one or more events in the event queue 228 to their designated web modules. In yet another embodiment, the web module has access to the event queue 228 directly (e.g., by bypassing the event listener 216) and checks it accordingly (e.g., by iterating through one or more entries in the event queue 228). Where a determination is made in the affirmative that the event is in the event queue (e.g., the "YES" branch of Operation 522), the method 502 proceeds to Operation 524. Where a determination is made in the negative that the event is in the event queue (e.g., the "NO" branch of Operation 522), the method 502 proceeds to Operation 520, where the web module continues to check the event queue 228 for the associated event. In one embodiment, the web module may be configured with a timeout or attempt failure threshold, such that the web module discontinues checking the event queue 228 after a specified time period has elapsed (e.g., the timeout) or after the web module has checked the event queue 228 a specified number of times (e.g., the attempt failure threshold)

The web module then obtains the content associated with the event identified in the event queue 228 from Operation 522 (Operation 524). In one embodiment, this may include obtaining the content from another source of data, such as another datastore (e.g., one or more of the databases 116-124), one or more web modules (e.g., another web module from the web modules 218), or another web site that the web browser 214 can access. In another embodiment, this may include determining the content from one of these other sources of data (e.g., determining an average temperature from a set of temperatures provided by another source of data).

The web module then renders or displays the content associated with the event identified from Operation 522 (Operation 526). Additionally, and/or alternatively, the content may not be rendered, but the web module may process the content for another purpose (e.g., for use with another web module or to be communicated to another website and/or datastore accessible by the web browser 214). The method 502 then returns to Operation 510 in FIG. 5A, where the web browser 214 then awaits for another interaction by the user 214. As mentioned previously, while FIG. 5A illustrates that the web module may await an interaction from the user 128, the web module may have a change in state from interactions with other web modules and/or datastores accessible by the web browser 214.

In this manner, the disclosed systems and methods provide self-contained web modules that operate independently when instantiated by a web browser. As the web modules operate independently, a developer does not need to concern himself or herself with the inner workings of other web modules. Traditionally, a developer would need information about how another developer's web module functioned to ensure that his or her own web module did not alter the other's behavior. In this disclosure those concerns are addressed by implementing an event queue and event listener, where a web module addresses and/or communicates with the event listener, which then disseminates information to other web modules via the event queue. This disclosure further provides a layout configuration and module handler, which allows the web browser 214 to continuously request content from the social networking server 112 and display the content when it is received. Instead of the web browser having to wait for all of the content for the web page to be received, the module handler inserts received web modules into their correct location, which allows the web browser 214 request other web modules while the module handler is working. Thus, this disclosure provides several technical solutions to technical problems that arise in the field of web development and networked communications.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 6:
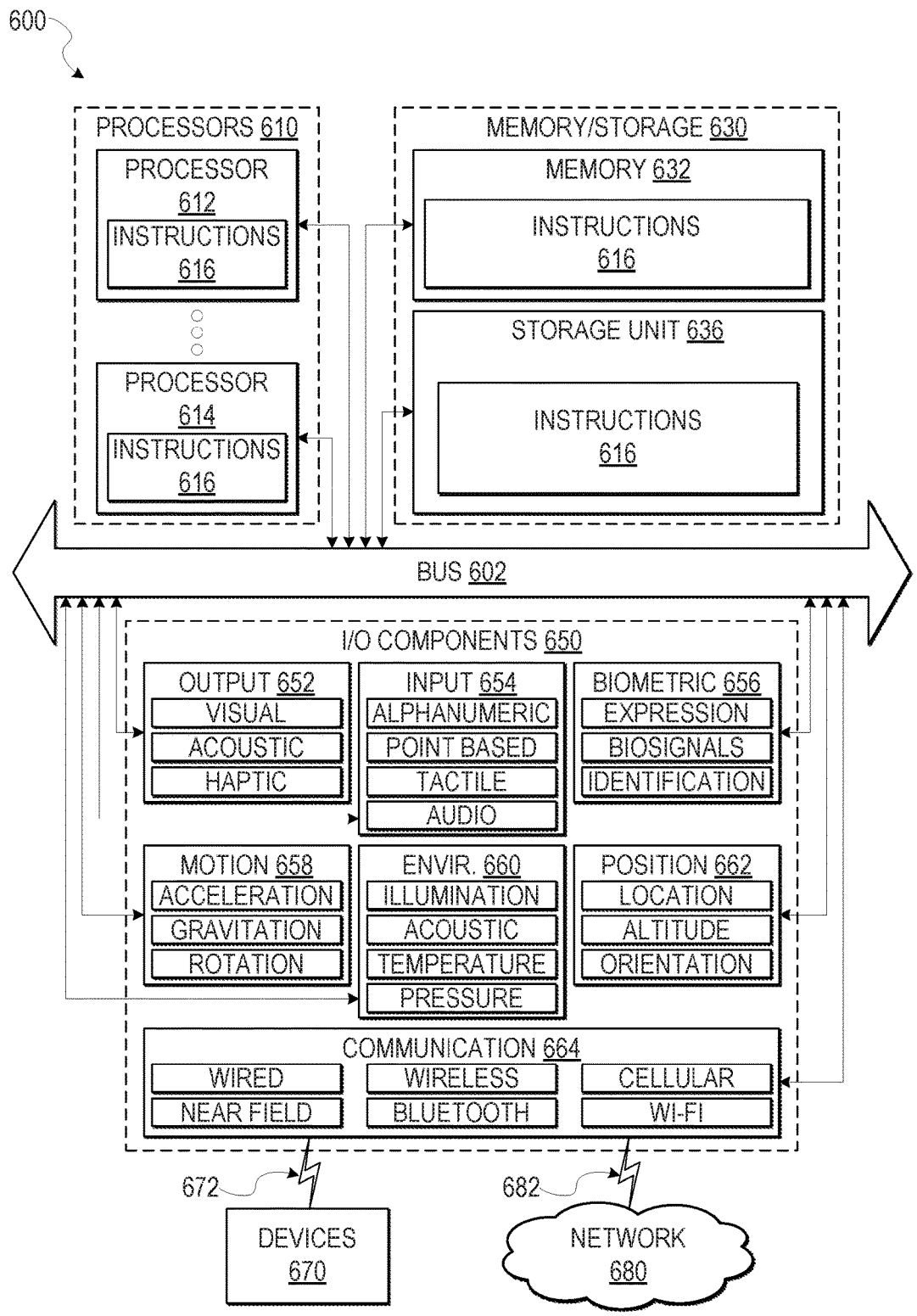
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the flow diagrams of FIGS. 4A-5B. Additionally, or alternatively, the instructions 616 may implement one or more of the components of FIG. 2. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute the instructions 616. The term "processor" is intended to include multi-core processor that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions 616 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable medium storing computer-executable instructions; and
at least one hardware processor communicatively coupled to the machine-readable medium that, when the computer-executable instructions are executed, configures the system to:
communicate a request for a web page;
receive a notification that a first transfer type is supported for sending the web page;
establish a connection according to the first transfer type for receiving the web page;
receive static content for the requested webpage, the static content comprising a layout identifying one or more locations where a web module is to be instantiated;
display the static content;
receive dynamic content for the requested webpage, the dynamic content comprising a plurality of web modules, wherein:
each web module of the plurality of web modules is to be instantiated at one or more corresponding locations selected from the one or more locations identified by the received layout; and
each web module of the plurality of web modules is initially hidden from view;
modify a Document Object Model of the requested web page to move one or more web modules selected from the plurality of web modules to their one or more corresponding locations;
execute a flush of the received webpage, the flush of the received webpage causing the one or more web modules selected from the plurality of web modules to be displayed; and
execute the one or more web modules selected from the plurality of web modules, wherein:
the one or more web modules selected from the plurality of web modules are assigned a first state selected from a plurality of states associated with the one or more web modules, the assigned first state identifying a behavior of the one or more web modules;
the one or more web modules are configured to change from the assigned first state to a second state selected from the plurality of states in response to at least one interaction with the one or more web modules; and
the one or more web modules communicate an event in response to a change in the assigned first state to the selected second state.

2. The system of claim 1, wherein the system is further configured to append the selected one or more web modules selected from the plurality of web modules as one or more leaf nodes to the modified Document Object Model of the requested web page.

3. The system of claim 1, wherein:
the system is further configured to instantiate an event listener that listens for events communicated by the selected one or more web modules selected from the plurality of web modules; and
the event listener is configured to maintain an event queue of events communicated by the selected one or more web modules.

4. The system of claim 1, wherein the selected one or more web modules selected from the plurality of web modules are each associated with a hidden tag that hides the selected one or more web modules from view; and
the hidden tag is removed from a corresponding selected web module based on the modification of the Document Object Model of the requested web page.

5. The system of claim 1, wherein:
the selected one or more web modules selected from the plurality of web modules are associated with a Document Object Model identifier that identifies the selected one or more web modules; and
the received layout includes the Document Object Model identifier to the identified one or more locations where the selected one or more web modules are to be instantiated.

6. A method comprising:
communicating a request for a web page;
receiving a notification that a first transfer type is supported for sending the web page;
establishing a connection according to the first transfer type for receiving the web page;
receiving static content for the requested webpage, the static content comprising a layout identifying one or more locations where a web module is to be instantiated;
displaying the static content;
receiving dynamic content for the requested webpage, the dynamic content comprising a plurality of web modules, wherein:
each web module of the plurality of web modules is to be instantiated at one or more corresponding locations selected from the one or more locations identified by the received layout; and
each web module of the plurality of web modules is initially hidden from view;
modifying a Document Object Model of the requested web page to move one or more web modules selected from the plurality of web modules to their one or more corresponding locations;

executing a flush of the received webpage, the flush of the received webpage causing the one or more web modules selected from the plurality of web modules to be displayed; and executing the one or more web modules selected from the plurality of web modules, wherein:

the one or more web modules of the plurality of web modules are assigned a first state selected from a plurality of states associated with the one or more web modules, the assigned first state identifying a behavior of the one or more web modules;

the one or more web modules are configured to change from the assigned first state to a second state selected from the plurality of states in response to at least one interaction with the one or more web modules; and the one or more web modules communicate an event in response to the change in the assigned first state to the selected second state.

7. The method of claim 6, further comprising:
appending one or more web modules selected from the plurality of web modules as one or more leaf nodes to the modified Document Object Model of the requested web page.

8. The method of claim 6, further comprising:
instantiating an event listener that listens for events communicated by the selected one or more web modules selected from the plurality of web modules; and wherein the event listener is configured to maintain an event queue of events communicated by the selected one or more web modules.

9. The method of claim 6, wherein one or more of the web modules selected from the plurality of web modules are each associated with a hidden tag that hides the selected one or more web modules from view; and the method further comprises:

removing the hidden tag from a corresponding selected web module based on the modification of the modified Document Object Model of the requested web page.

10. The method of claim 6, wherein:
the selected one or more web modules selected from the plurality of web modules are associated with a Document Object Model identifier that identifies the selected one or more web modules; and the received layout includes the Document Object Model identifier to the identified one or more locations where the the selected one or more web modules are to be instantiated.

11. A computer-readable memory having instructions stored thereon that, when executed by one or more hardware processors, causes a system to perform a plurality of operations comprising:

communicating a request for a web page;
receiving a notification that a first transfer type is supported for sending the web page;
establishing a connection according to the first transfer type for receiving the web page;
receiving static content for the requested webpage, the static content comprising a layout identifying one or more locations where a web module is to be instantiated;
displaying the static content;

receiving dynamic content for the requested webpage, the dynamic content comprising a plurality of web modules, wherein:

each web module of the plurality of web modules is to be instantiated at one or more corresponding locations selected from the one or more locations identified by the received layout; and each web module of the plurality of web modules is initially hidden from view;

modifying a Document Object Model of the requested web page to move one or more web modules selected from the plurality of web modules to their one or more corresponding locations;

executing a flush of the received webpage, the flush of the received webpage causing the one or more web modules selected from the plurality of web modules to be displayed; and executing the one or more web modules selected from the plurality of web modules, wherein:

the one or more web modules of the plurality of web modules are assigned a first state selected from a plurality of states associated with the one or more web modules, the assigned first state identifying a behavior of the one or more web modules;

the one or more web modules is configured to change from the assigned first state to a second state selected from the plurality of states in response to at least one interaction with the one or more web modules; and the one or more web modules communicate an event in response to the change in the assigned first state to the selected second state.

12. The computer-readable memory of claim 11, wherein the plurality of operations further comprises:

appending one or more web modules selected from the plurality of web modules as one or more leaf nodes to the modified Document Object Model of the requested web page.

13. The computer-readable memory of claim 11, wherein the plurality of operations further comprises:

instantiating an event listener that listens for events communicated by the selected one or more web modules selected from the plurality of web modules; and wherein the event listener is configured to maintain an event queue of events communicated by the selected one or more web modules.

14. The computer-readable memory of claim 11, wherein one or more of the web modules selected from the plurality of web modules are each associated with a hidden tag that hides the selected one or more web modules from view; and the plurality of operations further comprises removing the hidden tag from a corresponding selected web module based on the modification of the modified Document Object Model of the requested web page.

15. The computer-readable memory of claim 11, wherein:
the selected one or more web modules of the plurality of web modules are associated with a Document Object Model identifier that identifies the selected one or more web modules; and the received layout includes the Document Object Model identifier to the identified one or more locations where the selected one or more web modules are to be instantiated.

* * * * *